(12) United States Patent
van de Groenendaal

(10) Patent No.: US 8,225,379 B2
(45) Date of Patent: Jul. 17, 2012

(54) SYSTEM AND METHOD FOR SECURING NETWORKS

(75) Inventor: Johan van de Groenendaal, Allston, MA (US)

(73) Assignee: CA, Inc., Islandia, NY (US)

( * ) Notice: Subject to any disclaimer, the term of this patent is extended or adjusted under 35 U.S.C. 154(b) by 1994 days.

(21) Appl. No.: 10/885,551

(22) Filed: Jul. 6, 2004

(65) Prior Publication Data

US 2005/0172153 A1 Aug. 4, 2005

Related U.S. Application Data

(60) Provisional application No. 60/486,321, filed on Jul. 11, 2003.

(51) Int. Cl.
*H04L 9/32* (2006.01)
(52) U.S. Cl. ............................ 726/5; 380/270
(58) Field of Classification Search ................... 726/5
See application file for complete search history.

(56) References Cited

U.S. PATENT DOCUMENTS

| | | | | |
|---|---|---|---|---|
| 5,564,079 A | * | 10/1996 | Olsson | 455/456.3 |
| 6,112,095 A | * | 8/2000 | Wax et al. | 455/456.1 |
| 6,115,605 A | * | 9/2000 | Siccardo et al. | 455/426.1 |
| 6,134,448 A | * | 10/2000 | Shoji et al. | 455/456.2 |
| 6,140,964 A | * | 10/2000 | Sugiura et al. | 342/464 |
| 7,286,515 B2 | * | 10/2007 | Olson et al. | 370/338 |
| 7,336,670 B1 | * | 2/2008 | Calhoun et al. | 370/401 |
| 7,346,338 B1 | * | 3/2008 | Calhoun et al. | 455/411 |
| 2003/0092451 A1 | * | 5/2003 | Holloway et al. | 455/461 |
| 2003/0101292 A1 | * | 5/2003 | Fisher et al. | 709/328 |
| 2003/0216136 A1 | * | 11/2003 | McBrearty et al. | 455/410 |
| 2004/0141616 A1 | * | 7/2004 | Himmel et al. | 380/270 |
| 2007/0286143 A1 | * | 12/2007 | Olson et al. | 370/338 |
| 2008/0101283 A1 | * | 5/2008 | Calhoun et al. | 370/328 |

OTHER PUBLICATIONS

Brewin B: "IBM develops tool to detect rogue wireless LAN access points" Online, Jun. 17, 2002, XP002263355, the whole document.
Joshua Lackey, Andrew Roths, Jim Goodard: "Wireless intrusion detection" IBM, Online Apr. 2003, XP002299234 Retrieved from the Internet: URL: http://www.forum-intrusion.com/wireless_intrusion_detection.pdf. Retrieved on Oct. 10, 2004, the whole document.
Robert L. Bogue: "Stumble across rogue wireless access points" ZDNET, Online Nov. 26, 2002, XP002299235 Retrieved from the internet: URL: http://insight.zdnet.co.uk/hardware/servers/0,39020445,2126559,00.htm Retrieved on Oct. 5, 2004, the whole document.

(Continued)

*Primary Examiner* — Kambiz Zand
*Assistant Examiner* — Yonas Bayou
(74) *Attorney, Agent, or Firm* — Baker Botts L.L.P.

(57) ABSTRACT

A method for securing a network including providing one or more information sources, identifying one or more devices on the network using the information sources and determining whether identified devices are authorized.

47 Claims, 6 Drawing Sheets

OTHER PUBLICATIONS

Chirumamilla M K et al.: "Agent based intrusion detection and response system for wireless lans" ICC 2003. 2003 IEEE International Conference on Communications, New York, NY: IEEE, US. vol. 1 of 5, May 11, 2003, p. 492-496, XP010642798 ISBN: 0-7803-7802-4, Abstract, III. Design.

Christopher R. Ameter, Russel A. Griffth, John K. Rickett: "Whiff wireless intrusion detection system" Fundstone white paper, Online, Feb. 20, 2003, XP002299236 Retrieved from the internet: URL: http://www.foundstone.com/resources/whitepapers/cmu-whiff-wp.pdf?PHPSESSID=e57dd7353d81a7d5837811add9e19413 Retrieved on Oct. 5, 2004, the whole document.

Wardriving.Com: "Feb. 2003 News" Online, Feb. 2003, XP002299866 Retrieved from the Internet: URL: http://www.wardriving.com/febnews03.php Retrieved on Oct. 7, 2003, Used for dating XP2299236, see Feb. 20, 2003 entry.

* cited by examiner

ID NETWORKS

SYSTEM AND METHOD FOR SECURING NETWORKS

REFERENCE TO RELATED APPLICATION

The present disclosure is based on provisional application Ser. No. 60/486,321, filed Jul. 11, 2003, the entire contents of which are herein incorporated by reference.

BACKGROUND

1. Technical Field

The present disclosure relates to networks and, more specifically, to systems and methods for securing networks.

2. Description of the Related Art

While modern computer networks are invaluable for helping organize and share critical information, computer networks also provide new opportunities for unauthorized users and unauthorized devices (rogue devices) to gain access to sensitive information. To prevent the compromising of computer networks, many security features have been implemented to monitor what users and what devices are accessing network resources. Using these measures, computer networks can protect against unwanted users and unwanted devices that may compromise network security and expose sensitive data.

Many institutions and corporations use intrusion detection systems and related technologies to help secure computer networks. Intrusion detection systems employ a process called traffic sniffing whereby data along the computer network is monitored and inspected for signs of unauthorized access.

In a computer network, multiple sensors for sniffing network traffic may be installed at various points along the computer network data path. Optimally, all network traffic should pass through at least one sensor. Because computer networks may be divided into physically independent segments sharing a network address known as subnets, sensors are generally placed at each subnet.

Because all computers located on the same subnet share a network address, all computers within the same subnet can potentially access discrete units of communicated data known as packets regardless of which computer within the subnet the packets are intended for. The network adapters which connect a computer to the network then discriminate between packets so the computer can ignore packets not intended for that computer. Traffic sniffing sensors may therefore be set into a promiscuous mode whereby no packets are ignored and every packet moving across the subnet may be inspected regardless of its intended recipient.

For a computer network, providing traffic sniffing sensors located at each subnet may be a suitable method for protecting against intrusions and unauthorized access to the network.

Today, wireless networking devices are an increasingly popular component of computer networks. Using wireless networking hardware such as wireless access points, computers and other devices are able to gain access to computer networks wirelessly by radio communication. A wireless access point is a radio transceiver that is physically wired to the computer network and broadcasts network access.

Popular implementations of wireless networking include, for example, devices using the 802.11x family of IEEE wireless LAN protocols, such as the 802.11b protocol.

Wireless networking is convenient, allowing for untethered network connectivity anywhere that is within range of the wireless signal. However, wireless networking also poses new security risks to computer networks.

Wireless networking can allow unwanted users and unwanted devices to gain access to the computer network. Even conventional wired networks are not immune to the security threats posed by wireless networking. This is because one or more computers wired to the computer network might contain a wireless network device such as an adapter or access point. Such wireless devices may allow unauthorized users the opportunity to connect to the computer network through the computer associated with the wireless network device, creating an ad-hoc wireless network. Because many modern portable computers come preconfigured with wireless networking adapters, it is possible for a user to unwittingly broadcast network access over the airways.

Wireless networks complicate intrusion detection systems. Traffic sniffing sensors capable of sniffing wireless traffic should be within range of the radio signal carrying the packets. The range of wireless networking devices is dictated by such factors as the sensitivity of the amplifier within the sensor, the gain of the antennas used by the sensor and the RF spectrum profile. The RF spectrum profile is the ability of the radio signal to carry across distances, penetrate through obstacles such as walls and the susceptibility of the radio signal to such factors as radio interference caused by other sources of radio waves such as microwave ovens and environmental factors such as the weather. Therefore, in order to have complete traffic sniffing coverage, multiple sensors may be required.

The nature of wireless networking creates additional obstacles to intrusion detection. Wireless traffic is generally encrypted to guard against unauthorized monitoring. Therefore the analysis of sniffed packets may be limited unless some secret information such as an encryption key is known to the sensor.

In the wireless network, the potential for rogue devices is large. In a wired network, an unauthorized device is physically connected to the computer network in order to gain access to the network. This makes it difficult for unauthorized users to connect devices to the network without being granted physical access onto the premises containing the computer network. However, because wireless networks can communicate through walls and floors, it is no longer necessary for an unauthorized user seeking to connect a rogue device to the network to gain physical access onto the premises. Additionally, wireless networks create the possibility that an authorized user is inadvertently broadcasting network connectivity in an insecure manner through a wireless network adapter installed in the user's computer. Such a security breach may even occur without the user's knowledge as the user's computer reaches to form an ad hoc network with other wirelessly equipped computers, even if these computers are located in an adjacent floor or building occupied by people not affiliated with the institution or corporation housing the computer network.

SUMMARY

A method for securing a network including providing one or more information sources, identifying one or more devices on the network using the information sources, determining whether identified devices bridge the network and determining whether identified devices are authorized or rogue.

A system for securing a network including a providing unit for providing one or more information sources, an identifying unit for identifying one or more devices on the network using the information sources, a bridge-determining unit for determining whether identified devices bridge the network and an authorization-determining unit for determining whether identified devices are authorized or rouge.

A computer system including a processor and a program storage device readable by the computer system, embodying a program of instructions executable by the processor to perform method steps for securing a network, the method including providing information sources, identifying devices on the network using the information sources, determining whether identified devices bridge the network and determining whether identified devices are authorized or rouge.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
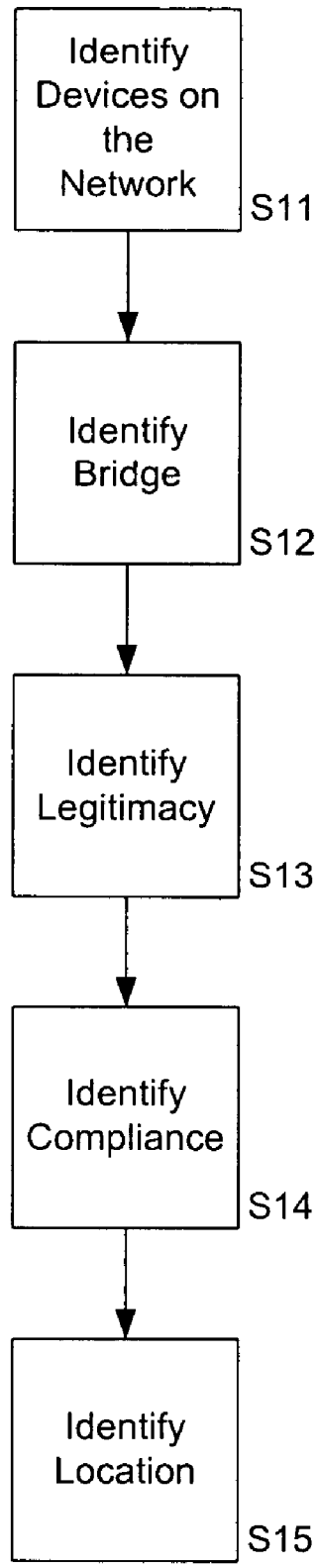
FIG. 1 illustrates an overview of an embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

The current disclosure describes a system and method for securing networks. According to an embodiment of the disclosure, a system and method for securing networks using traffic sniffing sensors in a network that may be wired, wireless or a combination of wired and wireless is described.

FIG. 1 illustrates an overview of an embodiment of the current disclosure. First, all devices on a network are identified (Step S11). To accomplish this, traffic sniffing sensors may be deployed throughout the network to monitor network traffic to collect the packets that move across the network. Collected packets can then be analyzed to extract various packet attributes. Examples of extracted attributes may include the IP address and MAC address the packet has been sent from and the IP address the packet has been sent to. An IP address is a 32-bit number assigned to a computer or device on the network that is unique to that network. A MAC address is a 48-bit number that has been hardwired into the network adapter which connects a computer or device to the network, this number being universally unique.

By analyzing the collected packets and their corresponding addressing information, devices on the network can be identified.

It can then be determined whether the identified devices are bridging the network (Step S12). Bridging includes connecting two or more networks together over a single computer which is connected to each network for the purpose of sharing a data connection such as an internet connection. This determination can be made, for example, by analyzing and correlating the packets identified that have been communicated wirelessly with the packets identified that have been communicated through the wired connection.

Figure 2:
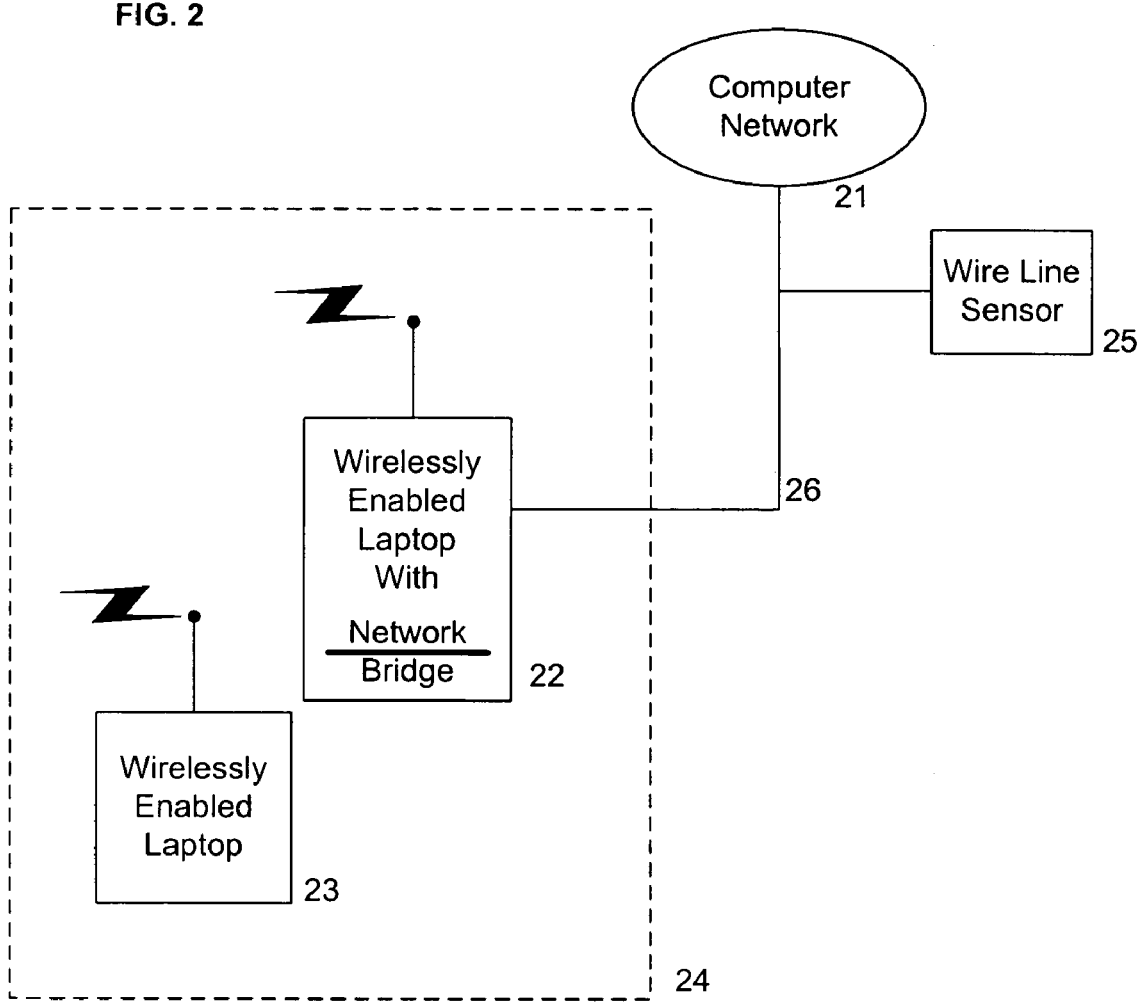
FIG. 2 illustrates an example of bridging a rogue wireless network to a wired network.

FIG. 2 illustrates an example of bridging a rogue wireless network to a wired network. In this example, computer 22 is connected to the computer network 21. Computer 22 is sanctioned to be on the network and is therefore not rogue. Computer 22 is a laptop that is equipped with a wireless network adapter and is therefore referred to as a wirelessly enabled laptop. Another wirelessly enabled laptop 23 is located in the vicinity of computer 22 but is not sanctioned to access network 21 or network 24. Both computers 22 and 23 have formed an ad hoc wireless network 24. Computer 22, which is connected both to the wired computer network 21 and the ad hoc computer network 24 is configured to bridge the two networks 21 and 24 together. Computer 23 is thus able to access the computer network 21 via laptop 22 even though it is not sanctioned to do so.

A wire line sensor 25 may be attached to the network feed 26 connecting computer 22 to the network 21. When packets along this network feed 26 are analyzed, packets addressed to and/or from computer 23 can be detected within the packets addressed to and/or from computer 22. In this way, it can be determined that computer 22 has bridged the network (Step S12).

It can then be determined whether the identified devices are legitimately on the network (Step S13). This can be accomplished, for example, by querying known devices on the network to ascertain what other devices they are in contact with. All devices can then be checked against one or more databases containing information on which devices are sanctioned to be on the network.

Figure 3:
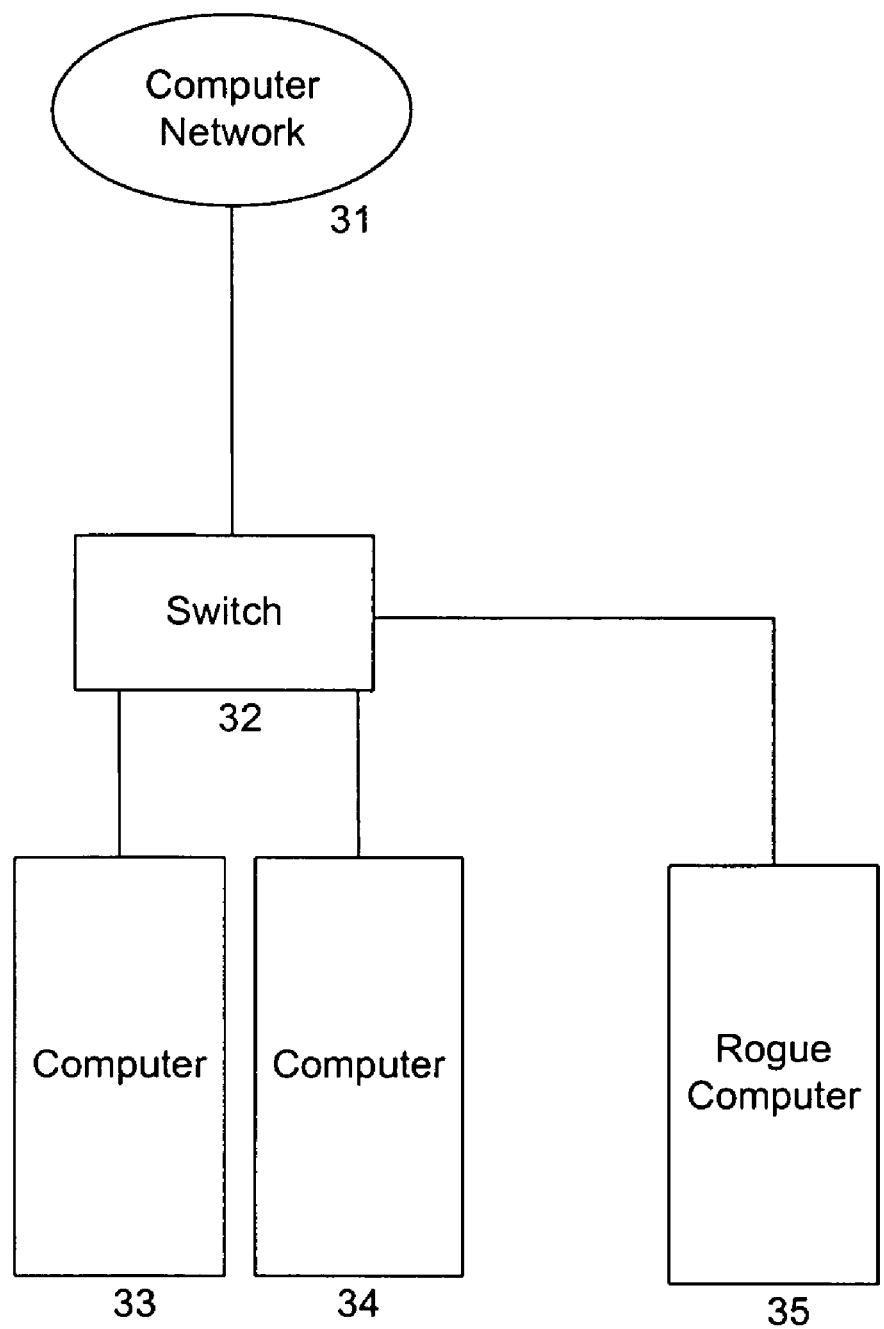
FIG. 3 illustrates an example of rogue devices on a network.

An example of determining whether identified devices are legitimately on a computer network (Step S13) is illustrated in FIG. 3. Here switch 32 is a device that has been identified on the network and matches a database entry in a database of sanctioned devices (not shown). Computers 33 and 34 are also identified and match the database. However, when switch 32 is queried, switch 32 reveals that in addition to computers 33 and 34, another computer (rogue computer 35) is connected to the switch 32. Computer 35 was not originally identified (Step 11) because it was not sending or receiving packets when checked. However, this rogue computer 35 device is now identified because switch 32 reports being connected to a device not matching the database.

Once all devices to be checked are identified, the devices may then be further checked to see if they comply with predetermined corporate policy (Step S14). For example, many corporations and institutions rely on the security of their computer networks. Even sanctioned devices, if set incorrectly, can create vulnerability in the security of computer networks. Therefore checking to make sure all devices are properly within established guidelines can be useful in managing network security.

Traffic sniffing sensors may be used that have the ability to determine the physical position of wireless devices. Such sensors are referred to as location aware traffic sensors. Some examples of location aware traffic sensors include sensors with a three part triangulation antenna that are capable of measuring the signal strength of a signal emanating from a rogue device from three different locations and using this information to triangulate a source. Other examples of location aware traffic sensors include the use of at multiple (e.g., three) separate sensors that are each capable of measuring the signal strength of a signal emanating from the same rogue device. Signal strength information from each sensor is then combined to triangulate the location of the rogue device. Where such sensors are used, the location of devices can be ascertained to the extent possible by the technology deployed (Step S15). This information can be used, for example, to verify that devices remain in their proper location and that no wireless devices in communication with the network are located beyond the physical property of the institution or corporation housing the computer network. This can be useful to make sure wireless devices connected to the network are located within the office building of the corporation, for example, rather than in a van parked in the parking lot where a hacker is attempting to hack into the network.

Figure 4:
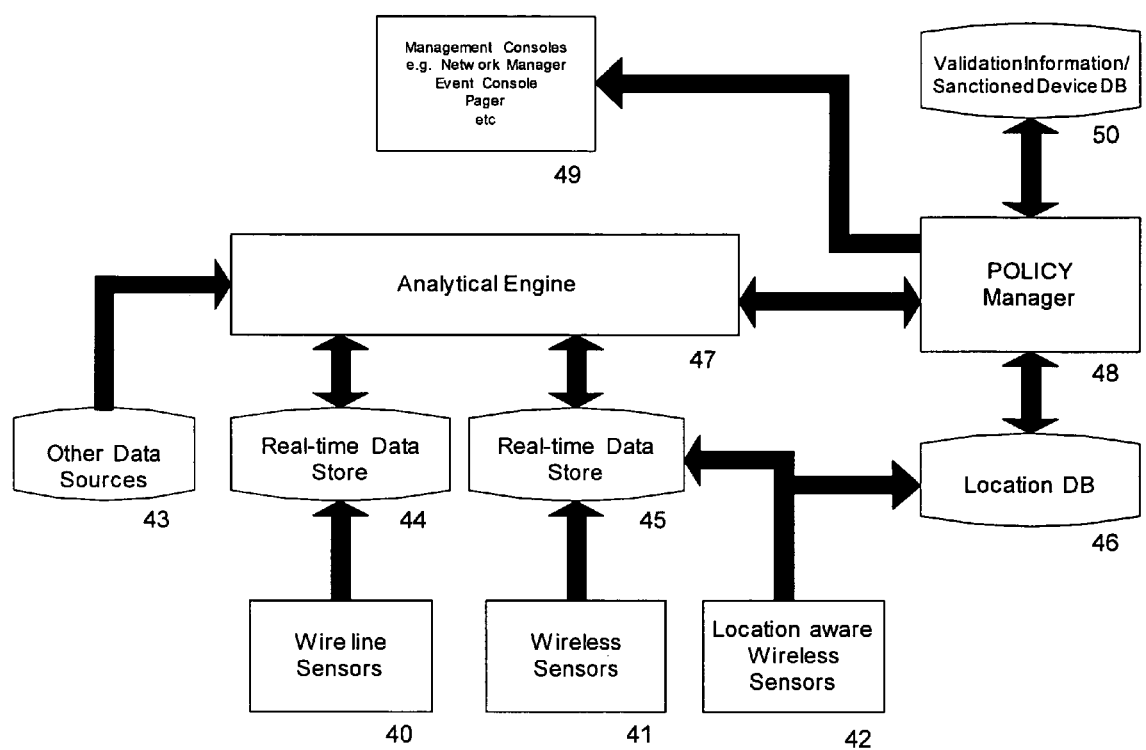
FIG. 4 illustrates the embodiment of the current disclosure illustrated in FIG. 1 with increased specificity.

FIG. 4 illustrates an embodiment of the present disclosure wherein multiple information sources may be used to examine devices present on the network to determine whether the device is legitimate or rogue, determine if the device conforms to standards that have been devised to ensure network security and/or to determine the physical location of the device.

Information sources may include, for example, devices that are capable of monitoring network traffic. For example, information sources may include traffic sniffing sensors. A specific example of a type of information source is a wire line sensor 40. Wire line sensor 40 may be physically plugged-into a wired network. The wire line sensor 40 collects visible network packets that are communicated within the sensor's realm of observation. For example, the realm of observation may be that isolated portion of the network that the sensor is plugged into. A realm of observation may be, for example, a network subnet, and/or a particular channel of communication (a port) on a network device.

The wire line sensor 40 may be used to examine collected packets and extract various packet attributes. Extracted attributes may include, for example, the data time stamp indicating at what time the packet was sent, the protocol used, for example TCP, the destination MAC address, the source MAC address, the destination IP address, the source IP address and the number of times the packet has been routed from one isolated network segment to another (the number of hops). Additional analysis may also be performed by the wire line sensor to gain additional information about packets traversing the network.

Data collected by the wire line sensor 40 can be sent to a real-time data store 44. The real-time data store 44 is capable of receiving and storing data as it is collected. The data can then be sent to an analytical engine 47 for further analysis.

Another specific example of an information source is a wireless sensor 41. Wireless sensors 41 collect wireless traffic specific to the wireless protocol being monitored. For example, a wireless sensor 41 using the 802.11b protocol is capable of monitoring wireless traffic using the 802.11b protocol. Wireless sensors 41 operate similarly to wired sensors 40. However, the realm of a wireless sensor is not limited by physical connectivity but is instead limited by the RF range of the device (e.g., the visibility). The wireless sensor 41 may be used to examine collected packets and extract various packet attributes. Extracted attributes may include, for example, the data time stamp, the encapsulated protocol (the protocol used within the wireless protocol) used, for example, TCP, the destination MAC address, the source MAC address, the destination IP address, the source IP address, the number of hops and the maximum number of hops permitted before a packet that has not reached its intended recipient is discarded, this value is known as the Time To Live value (TTL). Additional analysis may also be performed by a wire line sensor to gain additional information about packets traversing the network.

Data collected by the wireless sensor 41 may be sent to a real-time data store 45. The real-time data store 45 is capable of receiving and storing data as it is collected. The data may then be sent to an analytical engine 47 for further analysis.

Another specific example of an information source is a location aware wireless sensor 42. Location aware wireless sensors 42 perform similar functions as the wireless sensors 41 just described. However, location aware wireless sensors 42 are additionally capable of ascertaining the physical location of each device within its visibility as described above.

Data collected by the location aware wireless sensor 42 is sent to a real-time data store 45 along with the data collected from the wireless sensors 41 where it is then sent to the analytical engine 47. The location information may also be stored in a database of device locations 46.

Other network data sources 43 may also be used to collect information that can be useful in examining devices present on the network to determine whether a device is legitimate or rogue, determining if the device conforms to standards that have been devised to ensure network security and/or determining the physical location of the device. For example, wireless access points may be used to provide useful information relating to packets the wireless access point transmitted and received. For example, wireless access points can provide MAC addresses, IP addresses, information pertaining to the current state of packets and number of packets transmitted and received, etc.

Network devices such as switches and routers may be used to provide information relating to packets that these network devices manage. For example, network devices such as switches and routers can provide MAC addresses and IP addresses of the packets they manage.

Network and system management applications (NSM applications) are applications used by organizations to monitor critical servers and devices on a computer network. NSM applications are another example of other network data sources 43. NSM applications may also be combined with classification engines, for example, wireless network management options (WNMO) or network mapper (Nmap). Classification engines are computer programs designed to analyze and identify devices known to be on a network.

Information collected from other network data sources 43 can be sent to the analytical engine 47 for analysis. The analytical process carried out by the analytical engine 47 is responsible for using the collected information to determine what devices are on the network and whether those devices on the network are legitimate or rogue, whether those devices conform to company standards that have been established to ensure network security and/or where those devices are physical located.

On order to carry out its analysis, analytical engine 47 receives validation information 50. Validation information 50 is information that can be used to determine if an identified device on the network is sanctioned to be on the network. Validation information 50 may include information provided from asset and inventory management systems. For example, organizations often use databases for storing information about assets and inventory held by that organization. These databases can be accessed to produce a database of sanctioned devices 50. A policy manager 48 can be used to access the database of sanctioned devices and correlate this information with the information from the location database 46 built from the data collected by the location aware wireless sensors 42. For example, the sanctioned device database 50 may contain information as to where a particular device is supposed to be located. This information can be correlated with information stored in the location database 46 pertaining to the location where the particular device has been observed.

Another example of validation information includes information from access control systems (ACS), authentication/authorization/accounting (AAA) systems and/or billing systems. These are examples of systems by which the use of particular devices may be tracked to determine who is using devices and for what purposes these devices are being used. Whether these systems are implemented for the purposes of authenticating users on devices or for accounting or billing for the use of these devices, these systems are a valuable store of information pertaining to what devices are sanctioned on the network and can therefore be included in the sanctioned device database 50. Having access to such systems as these helps in identifying the legitimacy of a device during the analysis process.

The analytical engine 47 correlates data collected from the various data sources and real-time data stores. This correlation process can be hierarchical to enhance the efficiency of the analysis and helps to assure analysis occurs within a reasonable length of time. This correlation may be implemented using one or more correlation processes.

One example of a correlation process that can be used may be referred to as a wireless unit intent algorithm. This algorithm analyzes the source and destination IP and MAC address in the wireless packet. If the IP addresses are not available, the address resolution protocol (ARP) cache tables in the routers and switches connected to the network may contain the mapping of what IP addresses correspond to what MAC addresses. By analyzing the IP and MAC addresses, it can be determined whether a device is attempting to or has successfully bridged the network to a second network. For example, a user whose wirelessly enabled computer is connected to a wired network might be establishing an ad hoc wireless network with another wirelessly enabled computer and bridging the ad hoc wireless network to the other wirelessly enabled computer allowing the other wirelessly enabled computer to gain access to the wired network. By analyzing the IP addresses and MAC addresses packets that are sent from and/or to, it can be determined if the network has been bridged when packets are detected that are addressed from and/or to an unknown or unauthorized IP or MAC address.

Another example of a correlation process that can be used is referred to as a realm bridged detection algorithm. This algorithm looks at multiple information sources on both the wired and wireless portions of the network to determine whether a device, for example a wireless access point, has been bridged to the network. This may be performed, for example, by examining the actual transmitted data to determine if there is a relationship between various packets. When a bridge has been detected, the algorithm can then query the device for associated devices to determine whether the bridged device is sanctioned or rogue.

After one or more of the correlation processes are performed and the characteristics of the devices have been identified, the sanctioned device database 50 can be consulted to determine if the device is sanctioned or rogue. Additionally, if the device is rogue and location information is available for that device; the device can be pinpointed and removed or isolated from the network. Information pertaining to rogue devices can then be sent to management consoles 49 to inform the network manager of the detected rogue device. For example, the occurrence may be reported as an event on an event console or the network manager can be informed, for example by email or by pager.

Figure 5:
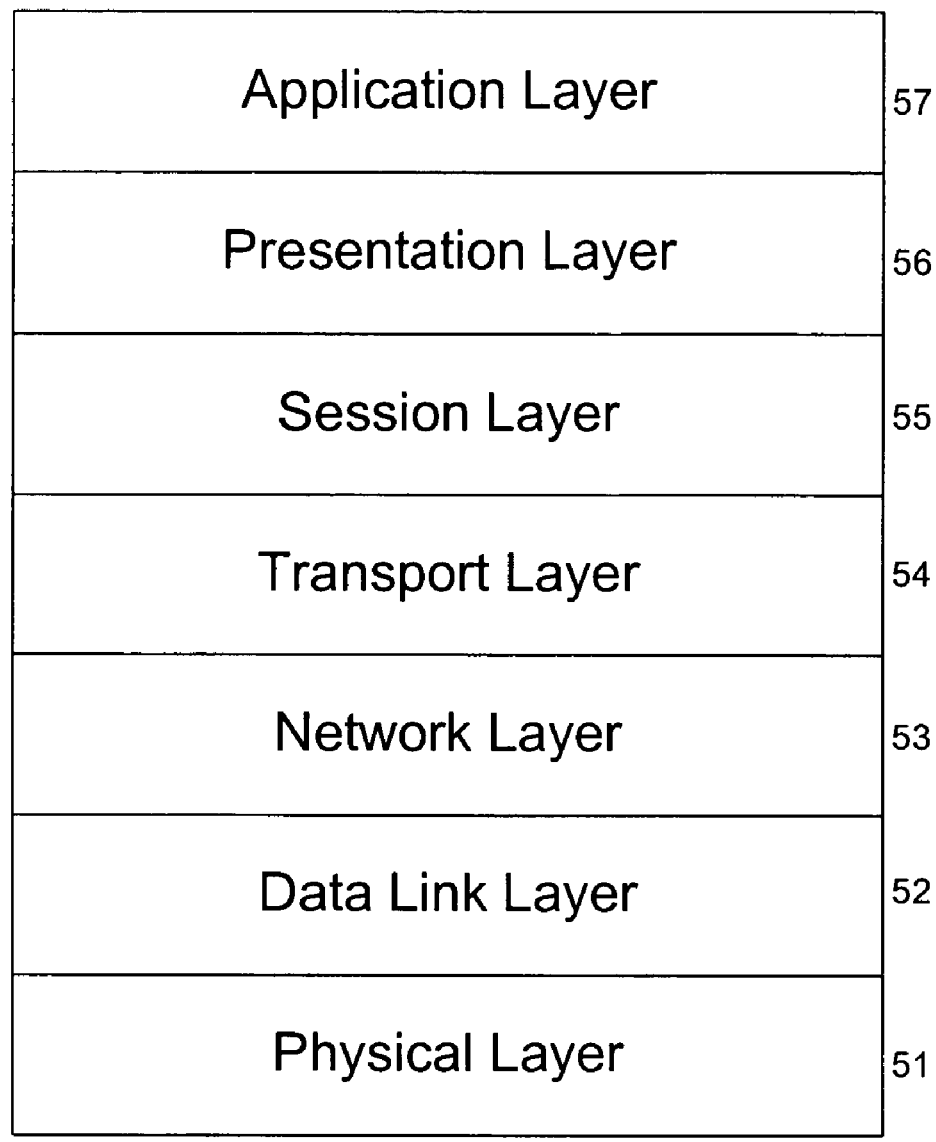
FIG. 5 illustrates the seven layers of the OSI reference model.

FIG. 5 illustrates the seven layers of the open systems interconnect (OSI) reference model (RM). The OSI-RM is an internationally accepted standard model of network architecture and the group of protocols used by the model. Each layer depends on the layer immediately below it and provides services to the layer immediately above it. The lowest layer is the physical layer 51. This layer defines the electrical and mechanical connections of the network. The data link layer 51 splits data into segments called frames for sending on the physical layer 51. This layer also receives acknowledgement frames. Error checking is performed and frames are resent where required. The network layer 53 determines the routing of packets along the data link layer 52. The transport layer 54 establishes and dissolves connections between hosts and allows for error-free communication between hosts. The session layer 55 establishes a connection between processes on different hosts and handles security and session creation. The presentation layer 56 performs text compression and format conversion to facilitate communication between hosts. The application layer 57 handles the user's view of the network.

The collection and analysis of RF information according to an embodiment of the present disclosure may use radio frequency informatics. Radio frequency informatics is a physical layer 51 analysis of information transmitted through the wireless network. By examining the RF signature of the transitions, the identity of the transmitting device can be ascertained. By examining and identifying sources of RF interference, both wanted and unwanted, and analyzing performance information related to the RF physical medium, the physical location of the transmitting device can be located when one or more appropriate sensors are deployed.

The collection and analysis of RF information according to an embodiment of the present disclosure may use network informatics. Network informatics is the collection and analysis of the data across the data link layer through the application layer 52-57. Here the type of traffic transmitted can be identified by analyzing the packets collected to determine the source and destination of the packets along with various other packet attributes. Network informatics can be achieved through sensors for sniffing network traffic, both wire line 40 and wireless 41, 42.

Figure 6:
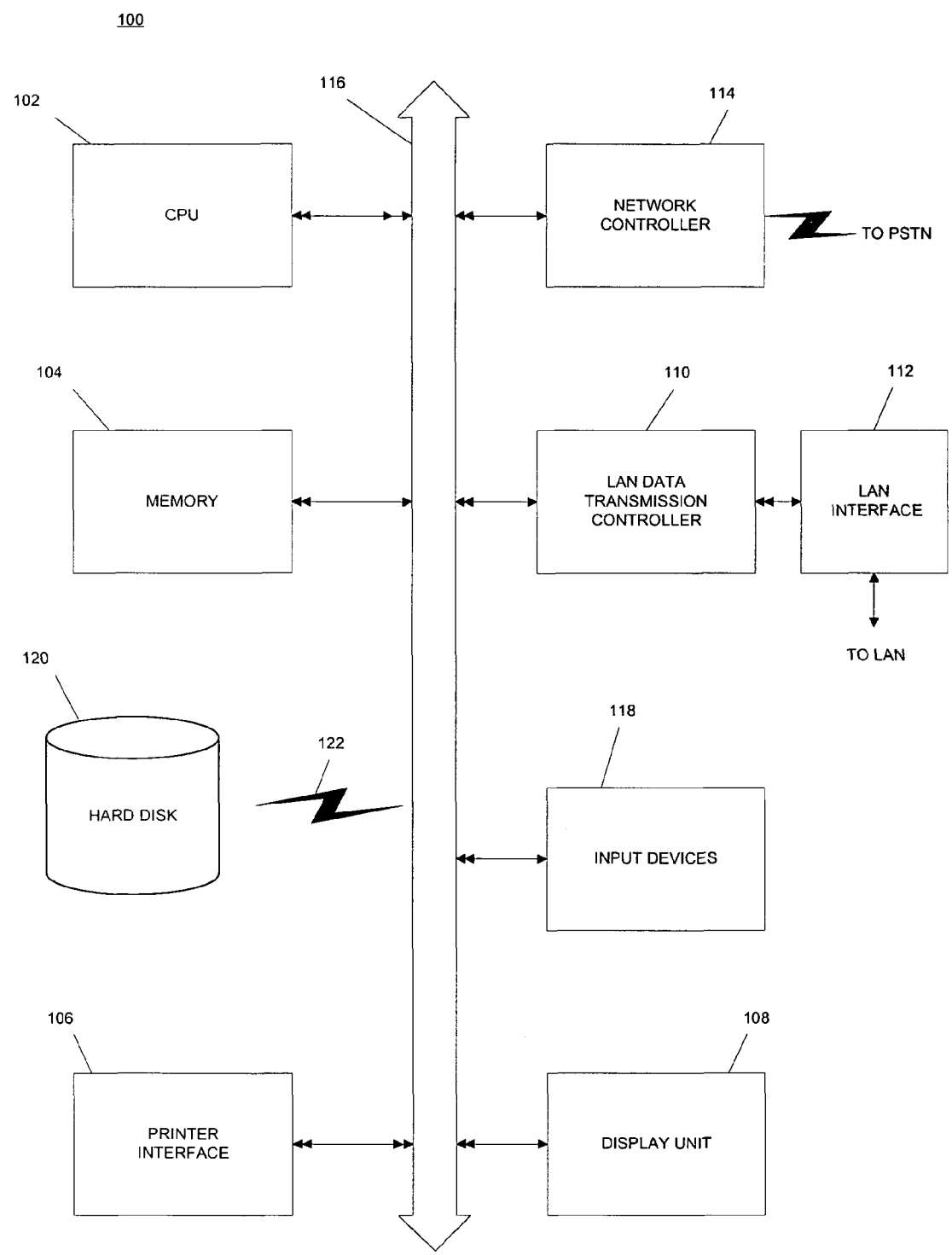
FIG. 6 illustrates an example of a computer system capable of implementing the method and apparatus of the present disclosure.

FIG. 6 shows an example of a computer which may implement the methods and systems of the present disclosure. The systems and methods of the present disclosure may be implemented in the form of one or more software applications running on one or more computer systems, for example, a mainframe, personal computer (PC), handheld computer, server, gateway, etc. The software applications may be stored on recording media locally accessible by the computer systems, for example, floppy disk, compact disk, hard disk, etc., or may be remote from the computer systems and accessible via a hard wired or wireless connection to a network, for example, a local area network, or the Internet.

The computer referred to generally as system 100 may include a central processing unit (CPU) 102, memory 104, for example, Random Access Memory (RAM), a printer interface 106, a display unit 108, a (LAN) local area network data transmission controller 110, a LAN interface 112, a network controller 114, an internal bus 116 and one or more input devices 118, for example, a keyboard, mouse etc. As shown, the system 100 may be connected to a data storage device, for example, a hard disk, 120, via a link 122.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for securing a network, comprising:
identifying one or more information sources;
using said one or more information sources to identify one or more authorized devices on a first network;
determining that a particular one of the identified authorized devices is bridging the first network and a second network, the second network comprising an adhoc wireless network established between the particular one of the identified authorized devices and a second wirelessly-enabled device; and
identifying the second wirelessly-enabled device communicating via the second network with the particular one of the identified devices; and
determining whether the second wirelessly-enabled device communicating via the second network with the particular one of the identified devices is authorized to be on the first network.

2. The method for securing a network of claim 1, further comprising determining whether the particular one of the identified devices complies with a predetermined policy.

3. The method for securing a network of claim 1, further comprising determining a location of one or more of said identified devices.

4. The method for securing a network of claim 1, wherein one or more of said information sources are wire line sensors.

5. The method for securing a network of claim 1, wherein one or more of said information sources are wireless sensors.

6. The method for securing a network of claim 1, wherein one or more of said information sources are location aware wireless sensors.

7. The method for securing a network of claim 1, wherein a wireless unit intent algorithm is used to correlate information from said information sources.

8. The method for securing a network of claim 1, wherein a realm bridged detection algorithm is used to correlate information from said information sources.

9. The method for securing a network of claim 1, wherein radio frequency informatics are used to collect and analyze information.

10. The method for securing a network of claim 1, wherein network informatics are used to collect and analyze information.

11. The method for securing a network of claim 1, wherein the first and second devices each comprise wirelessly enabled laptops.

12. The method for securing a network of claim 1, wherein the first network comprises an authorized wire network and the second network comprises an unauthorized, adhoc wireless network.

13. The method for securing a network of claim 1, wherein determining that the particular one of the identified authorized devices is bridging the first network and a second network comprises:
correlating a packet transmitted by the second device on the second network with packet detected on the first network.

14. A system for securing a network, comprising:
a detecting unit for detecting one or more information sources;
an identifying unit for identifying one or more authorized devices on a first network, using said one or more information sources;
a bridge-detecting unit for determining that a particular one of the identified authorized devices is bridging the first network and a second network, the second network comprising an adhoc wireless network established between the particular one of the identified authorized devices and a second wirelessly-enabled device;
the identifying unit further operable to identify the second wirelessly-enabled device communicating via the second network with the particular one of the identified devices; and
an authorization-determining unit for determining whether a second wirelessly-enabled device communicating via the second network with the particular one of the identified devices is authorized to be on the first network.

15. The system for securing a network of claim 14, further comprising a policy-determining unit for determining whether the particular one of the identified devices complies with a predetermined policy.

16. The system for securing a network of claim 14, further comprising a location-determining unit for determining a location of one or more of said identified devices.

17. The system for securing a network of claim 14, wherein one or more of said information sources are wire line sensors.

18. The system for securing a network of claim 14, wherein one or more of said information sources are wireless sensors.

19. The system for securing a network of claim 14, wherein one or more of said information sources are location aware wireless sensors.

20. The system for securing a network of claim 14, wherein a wireless unit intent algorithm is used to correlate information from said information sources.

21. The system for securing a network of claim 14, wherein a realm bridged detection algorithm is used to correlate information from said information sources.

22. The system for securing a network of claim 14, wherein radio frequency informatics are used to collect and analyze information.

23. The system for securing a network of claim 14, wherein network informatics are used to collect and analyze information.

24. A computer system comprising:
a processor; and
a program storage device readable by the computer system, embodying computer executable code for securing a network, the program storage device comprising:
code for identifying one or more information sources;
code for identifying one or more authorized devices on a first network using said one or more information sources;
code for determining that a particular one of the identified authorized devices is bridging the first network and a second network, the second network comprising an adhoc wireless network established between the particular one of the identified authorized devices and a second wirelessly-enabled device;
code for identifying the second wirelessly-enabled device communicating via the second network with the particular one of the identified devices; and
code for determining whether the second wirelessly-enabled device communicating via the second network with the particular one of the identified devices is authorized to be on the first network.

25. The computer system for securing a network of claim 24, further comprising code for determining whether the particular one of the identified devices complies with a predetermined policy.

26. The computer system for securing a network of claim 24, further comprising code for determining a location of one or more of said identified devices.

27. The computer system for securing a network of claim 24, wherein one or more of said information sources are wire line sensors.

28. The computer system for securing a network of claim 24, wherein one or more of said information sources are wireless sensors.

29. The computer system for securing a network of claim 24, wherein one or more of said information sources are location aware wireless sensors.

30. The computer system for securing a network of claim 24 wherein a wireless unit intent algorithm is used to correlate information from said information sources.

31. The computer system for securing a network of claim 24 wherein a realm bridged detection algorithm is used to correlate information from said information sources.

32. The computer system for securing a network of claim 24, wherein radio frequency informatics are used to collect and analyze information.

33. The computer system for securing a network of claim 24, wherein network informatics are used to collect and analyze information.

34. A computer recording medium including computer executable code for securing a network, comprising:
　　code for identifying one or more information sources;
　　code for identifying one or more authorized devices on a first network, using said one or more information sources;
　　code for determining that a particular one of the identified authorized devices is bridging the first network and a second network, the second network comprising an adhoc wireless network established between the particular one of the identified authorized devices and a second wirelessly-enabled device; and
　　code for identifying the second wirelessly-enabled device communicating via the second network with the particular one of the identified devices; and
　　code for determining whether the second wirelessly-enabled device communicating via the second network with identified devices are authorized to be on the first network.

35. The computer recording medium of claim 34, further comprising determining whether the particular one of the identified devices complies with a predetermined policy.

36. The computer recording medium of claim 34, further comprising determining a location of one or more of said identified devices.

37. The computer recording medium of claim 34, wherein one or more of said information sources are wire line sensors.

38. The computer recording medium of claim 34, wherein one or more of said information sources are wireless sensors.

39. The computer recording medium of claim 34, wherein one or more of said information sources are location aware wireless sensors.

40. The computer recording medium of claim 34, wherein a wireless unit intent algorithm is used to correlate information from said information sources.

41. The computer recording medium of claim 34, wherein a realm bridged detection algorithm is used to correlate information from said information sources.

42. The computer recording medium of claim 34, wherein radio frequency informatics are used to collect and analyze information.

43. The computer recording medium of claim 34, wherein network informatics are used to collect and analyze information.

44. A method for securing a network, comprising:
　identifying one or more information sources;
　using said one or more information sources to identify one or more authorized user computers on a wireline network;
　determining that a particular one of the identified authorized user computer is wirelessly enabled and bridging the wireline network and a wireless network, the wireless network comprising an unauthorized adhoc wireless network established between the particular one of the identified user computers and a wirelessly-enabled laptop computer; and
　identifying the wirelessly-enabled laptop computer communicating via the wireless network with the particular one of the identified authorized user computers; and
　determining that the wirelessly-enabled laptop computer communicating via the unauthorized adhoc wireless network with the particular one of the authorized user computers is not authorized to be on the wireline network.

45. A system for securing a network, comprising:
　a detecting unit for detecting one or more information sources;
　an identifying unit for identifying one or more authorized user computers on a wireline network;
　a bridge-detecting unit for determining that a particular one of the identified authorized user computer is wirelessly enabled and bridging the wireline network and a wireless network, the wireless network comprising an unauthorized adhoc wireless network established between the particular one of the identified user computers and a wirelessly-enabled laptop computer;
　the identifying unit further operable to identify the wirelessly-enabled laptop computer communicating via the wireless network with the particular one of the identified authorized user computers; and
　an authorization-determining unit for that the wirelessly-enabled laptop computer communicating via the unauthorized adhoc wireless network with the particular one of the authorized user computers is not authorized to be on the wireline network.

46. A computer system comprising:
　a processor; and
　a program storage device readable by the computer system, embodying computer executable code for securing a network, the program storage device comprising:
　　code for identifying one or more information sources;
　　code for using said one or more information sources to identify one or more authorized user computers on a wireline network;
　　code for determining that a particular one of the identified authorized user computer is wirelessly enabled and bridging the wireline network and a wireless network, the wireless network comprising an unauthorized adhoc wireless network established between the particular one of the identified user computers and a wirelessly-enabled laptop computer;
　　code for identifying the wirelessly-enabled laptop computer communicating via the wireless network with the particular one of the identified authorized user computers; and
　　code for determining that the wirelessly-enabled laptop computer communicating via the unauthorized adhoc wireless network with the particular one of the authorized user computers is not authorized to be on the wireline network.

47. A computer recording medium including computer executable code for securing a network, comprising:

code for identifying one or more information sources;

code for using said one or more information sources to identify one or more authorized user computers on a wireline network;

code for determining that a particular one of the identified authorized user computer is wirelessly enabled and bridging the wireline network and a wireless network, the wireless network comprising an unauthorized adhoc wireless network established between the particular one of the identified user computers and a wirelessly-enabled laptop computer; and code for identifying the wirelessly-enabled laptop computer communicating via the wireless network with the particular one of the identified authorized user computers; and code for determining that the wirelessly-enabled laptop computer communicating via the unauthorized adhoc wireless network with the particular one of the authorized user computers is not authorized to be on the wireline network.

* * * * *